(12) United States Patent
Matsushita et al.

(10) Patent No.: US 10,491,307 B2
(45) Date of Patent: Nov. 26, 2019

(54) OPTICAL TRANSMITTER (71) Applicant: FUJITSU LIMITED, Kawasaki-shi, Kanagawa (JP)

(72) Inventors: Shuzo Matsushita, Kawasaki (JP); Taku Saito, Kawasaki (JP); Kosuke Komaki, Kawasaki (JP); masamichi sugamoto, Kawasaki (JP); Hironobu Hongou, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/592,601

(22) Filed: May 11, 2017

(65) Prior Publication Data
US 2017/0331559 A1 Nov. 16, 2017

(30) Foreign Application Priority Data

May 16, 2016 (JP) .................. 2016-097982

(51) Int. Cl.
*H04B 10/564* (2013.01)
*H04B 10/079* (2013.01)
(Continued)

(52) U.S. Cl.
CPC ......... *H04B 10/564* (2013.01); *G02F 1/2255* (2013.01); *H04B 10/07955* (2013.01);
(Continued)

(58) Field of Classification Search
CPC ........ H04B 10/07955; H04B 10/50577; H04B 10/5162; H04B 10/5053; H04B 10/564; H04B 10/548; G02F 1/2255
(Continued)

(56) References Cited

U.S. PATENT DOCUMENTS 6,970,655 B2 * 11/2005 Ono ..................... H04B 10/505
398/186
7,106,497 B2 * 9/2006 Kawanishi ............... G02F 2/02
359/326
(Continued)

FOREIGN PATENT DOCUMENTS

EP 2 624 484 A1 8/2013
JP 2008-92172 4/2008

OTHER PUBLICATIONS

Nakagawa et al, Demonstration of FSK Light Label Receiver Prototype for Light Path Tracing of 112 Gbps DP QPSK Signal, Sep. 2013, ECOC, Th.2.A.4.pdf, All Doucment.*
(Continued)

*Primary Examiner* — Dibson J Sanchez
(74) *Attorney, Agent, or Firm* — Staas & Halsey LLP (57) ABSTRACT

There is provided an optical transmitter including a memory, a processor coupled to the memory and the processor to generate an electric signal, an optical generator to generate light, an optical modulator to modulate the light with the electric signal to create an optical signal, a first voltage electrode to apply a first voltage to the optical signal, a second voltage electrode to apply a second voltage to the optical signal to which the first voltage is applied, and a detector to detect an optical power of the optical signal to which the second voltage is applied, wherein the processor stops generating the electric signal, controls the first voltage electrode to change the first voltage after the stop of generating the electric signal, and controls the second voltage electrode to change the second voltage according to the detected optical power after the change of the first voltage.

4 Claims, 10 Drawing Sheets

(51) Int. Cl.
  *H04B 10/516* (2013.01)
  *H04B 10/548* (2013.01)
  *G02F 1/225* (2006.01)
  *H04B 10/50* (2013.01)

(52) U.S. Cl.
  CPC ... *H04B 10/5053* (2013.01); *H04B 10/50577* (2013.01); *H04B 10/5162* (2013.01); *H04B 10/548* (2013.01)

(58) Field of Classification Search
  USPC .................................................. 398/182–201
  See application file for complete search history.

(56) References Cited

U.S. PATENT DOCUMENTS

| | | | | |
|---|---|---|---|---|
| 7,239,763 | B2* | 7/2007 | Kawanishi | G02F 1/3136 385/1 |
| 7,245,787 | B2* | 7/2007 | Kawanishi | G02F 1/0123 385/1 |
| 8,170,422 | B2* | 5/2012 | Kawanishi | G02F 1/2255 398/140 |
| 8,582,981 | B2* | 11/2013 | Akiyama | H04B 10/50 398/188 |
| 9,014,572 | B2* | 4/2015 | Akiyama | H04B 10/50575 398/192 |
| 9,124,364 | B1* | 9/2015 | Sotoodeh | H04B 10/50577 |
| 9,240,838 | B2* | 1/2016 | Akiyama | H04B 10/50 |
| 9,419,720 | B2* | 8/2016 | Akiyama | G02F 1/0123 |
| 9,496,962 | B1* | 11/2016 | Wang | H04B 10/5053 |
| 10,042,190 | B2* | 8/2018 | Liu | G02F 1/0123 |
| 10,063,322 | B2* | 8/2018 | Akiyama | H04B 10/0795 |
| 2006/0263097 | A1* | 11/2006 | Akiyama | H04B 10/505 398/188 |
| 2007/0019968 | A1* | 1/2007 | Hashimoto | G02F 1/0327 398/198 |
| 2007/0133918 | A1 | 6/2007 | Cho et al. | |
| 2007/0165294 | A1* | 7/2007 | Witzel | H04B 10/505 359/245 |
| 2008/0080872 | A1 | 4/2008 | Tanaka et al. | |
| 2008/0112710 | A1* | 5/2008 | Tanaka | G02F 1/0123 398/188 |
| 2008/0181620 | A1* | 7/2008 | Sasaki | H04B 10/5053 398/198 |
| 2008/0239448 | A1* | 10/2008 | Tanaka | G02F 1/2255 359/245 |
| 2009/0047028 | A1* | 2/2009 | Terahara | H04B 10/505 398/188 |
| 2009/0115544 | A1* | 5/2009 | Kershteyn | H04L 27/2075 332/103 |
| 2009/0185810 | A1* | 7/2009 | Kaplan | G02F 1/225 398/184 |
| 2010/0021182 | A1* | 1/2010 | Asano | H04B 10/5057 398/188 |
| 2010/0202785 | A1* | 8/2010 | Kawanishi | H04B 10/505 398/185 |
| 2011/0007383 | A1* | 1/2011 | Gheorma | G02F 1/2255 359/326 |
| 2012/0106888 | A1* | 5/2012 | Goh | G02F 1/0327 385/3 |
| 2012/0155865 | A1* | 6/2012 | Kawakami | G02F 1/0123 398/43 |
| 2012/0288284 | A1* | 11/2012 | Yoshida | H04B 10/5053 398/186 |
| 2013/0141772 | A1* | 6/2013 | Jiang | H04B 10/50575 359/276 |
| 2013/0148981 | A1* | 6/2013 | Yasuda | H04B 10/50575 398/185 |
| 2013/0156444 | A1* | 6/2013 | Akashi | G02F 1/0123 398/186 |
| 2013/0195394 | A1* | 8/2013 | Hosokawa | H04B 10/5053 385/3 |
| 2013/0216220 | A1* | 8/2013 | Yamanaka | H04B 10/5053 398/38 |
| 2014/0010530 | A1* | 1/2014 | Goebuchi | H04B 10/5057 398/25 |
| 2014/0023368 | A1* | 1/2014 | Bhandare | H04J 14/06 398/65 |
| 2014/0029956 | A1* | 1/2014 | Le Taillandier De Gabory | G02F 1/0123 398/186 |
| 2014/0037286 | A1* | 2/2014 | Krasulick | H04B 10/5561 398/38 |
| 2014/0126913 | A1* | 5/2014 | Nakamoto | H04B 10/5051 398/115 |
| 2014/0153077 | A1* | 6/2014 | Kawakami | G02F 1/0123 359/259 |
| 2014/0168741 | A1* | 6/2014 | Li | G02F 1/0123 359/239 |
| 2014/0212136 | A1* | 7/2014 | Akiyama | H04B 10/2513 398/65 |
| 2014/0233965 | A1* | 8/2014 | Kim | H04B 10/5053 398/188 |
| 2014/0308047 | A1* | 10/2014 | Mak | H04B 10/5055 398/182 |
| 2015/0155934 | A1* | 6/2015 | Nakagawa | H04B 10/0775 398/34 |
| 2015/0171971 | A1* | 6/2015 | Enoki | H04B 10/5053 398/183 |
| 2015/0188639 | A1 | 7/2015 | Akashi | |
| 2016/0056896 | A1* | 2/2016 | Toya | H04B 10/5053 398/183 |
| 2016/0099776 | A1* | 4/2016 | Nakashima | H04B 10/50572 398/186 |
| 2016/0269123 | A1* | 9/2016 | Akiyama | H04B 10/5161 |
| 2016/0282699 | A1* | 9/2016 | Gottwald | H04B 10/50577 |
| 2017/0117961 | A1* | 4/2017 | Yoneyama | H04B 10/50575 |
| 2017/0237500 | A1* | 8/2017 | Nishimoto | G08C 23/04 398/184 |
| 2018/0267340 | A1* | 9/2018 | Rohde | G02F 1/0123 |

OTHER PUBLICATIONS

Extended European Search Report dated Oct. 13, 2017, in corresponding European Patent Application No. 17170815.9.
Tanimura et al., "In-Band FSK Auxiliary Channel toward Adaptive Optical Network", IEICE Transaction B, vol. J96-B, No. 3, Mar. 2013, pp. 263-273.
European Office Action dated Jan. 25, 2019 in European Application No. 17 170 815.9 (5 pages).

* cited by examiner

| φ PULL-IN POINT | +90° | -90° |
|---|---|---|
| 90° | POWER MAXIMIZED | POWER MINIMIZED |
| 270° | POWER MINIMIZED | POWER MAXIMIZED |

NO FSK OVERLAPPING

FSK OVERLAPPING

OPTICAL TRANSMITTER

CROSS-REFERENCE TO RELATED APPLICATION

This application is based upon and claims the benefit of priority of the prior Japanese Patent Application No. 2016-097982, filed on May 16, 2016, the entire contents of which are incorporated herein by reference.

FIELD

The embodiments discussed herein are related to an optical transmitter to transmit data by optical transmission.

BACKGROUND

With the increase of communication traffic in a backbone optical network, the capacity of an optical communication system has been increased. As an optical transmitter installed on an optical network, a Mach-Zehnder (MZ) type optical modulator capable of modulating light at a high speed is used. Further, in order to optimize the characteristic of an optical signal transmitted by the MZ type optical modulator, for example, the Mach-Zehnder type optical modulator has an automatic bias control (ABC) circuit that prevents a transmission signal from being deteriorated by drift. The ABC circuit applies each bias voltage (hereinafter, referred to as a "bias" in some cases) of I, Q, and φ to the modulator.

Since the operation characteristics of the ABC circuit drift by a variation of a temperature or aging, the bias may not be operated with a fixed value. As a result, in order to maintain the quality of the optical signal, it is necessary to constantly feedback-control the output fluctuation of the modulator at all times and make the bias to follow an optimum point.

As a feedback control method of the ABC circuit, there is proposed a method that adjusts a bias voltage by superimposing a low-frequency pilot signal (pilot tone) with respect to the branch outputs of the optical modulator so as to minimize a monitor amplitude of the pilot tone (see, e.g., Japanese Laid-Open Patent Publication No. 2008-092172).

A Dual-Polarization (DP)-N-Quadrature Amplitude Modulation (QAM) MZ type optical modulator (N represents the number of symbols) bias-controls 6 points of, for example, I, Q, and φ at an X side and I, Q, and φ at a Y side. The biases of I, Q, and φ may be similarly controlled by the pilot tone superimposing method.

Figure 10:
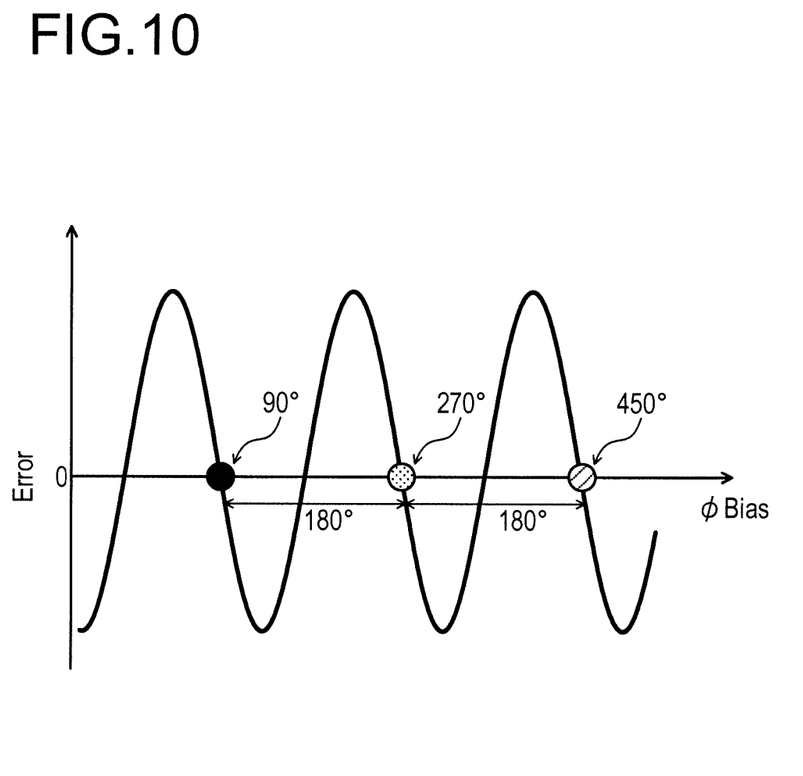
FIG. 10 is a diagram for describing a pull-in point of φ bias.

FIG. 10 is a diagram for describing a pull-in point of the φ bias. The horizontal axis represents the φ bias, and the vertical axis represents a control error amount of the pilot tone superimposing method. As the control error amount at the time of executing an ABC, 2f0 is detected in synchronization detection of the ABC circuit during an optimal control when the pilot tone has a frequency of f0. When the control error amount deviates from the optimal point, f0 is detected. As illustrated in FIG. 10, when the φ bias is changed, an accurately controlled position (the error amount is 0) exists every 180° based on a point of 90° (270°, 450°=90°).

Related technologies are disclosed in, for example, Japanese Laid-Open Patent Publication No. 2008-092172.

SUMMARY

According to an aspect of the invention, an optical transmitter to transmit an optical signal modulated with an electric signal, the optical transmitter includes at least one memory, at least one processor coupled to the at least one memory and the at least one processor configured to generate the electric signal, an optical generator configured to generate light, an optical modulator configured to modulate the light generated by the optical generator with the electric signal generated by the at least one processor to create an optical signal, a first voltage electrode configured to apply a first voltage to the optical signal created by the optical modulator, a second voltage electrode configured to apply a second voltage to the optical signal to which the first voltage is applied by the first voltage electrode, and a detector configured to detect an optical power of the optical signal to which the second voltage is applied by the second voltage electrode, wherein the at least one processor is configured to stop generating the electric signal, control the first voltage electrode to change the first voltage after the stop of generating the electric signal, and control the second voltage electrode to change the second voltage according to the optical power detected by the detector after the change of the first voltage.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

In an ABC circuit in the related art, whenever a signal is created at the time of data transmission, a pull-in phase of a φ bias is changed. Thus, it is not possible to always set the same pull-in point (e.g., 90°). In addition, the φ bias is indefinitely pulled in at any one of 90°, 270°, and 450°. Thus, it is unclear which phase the φ bias is pulled in. This makes it impossible to determine one phase at the time of frequency modulation of the main signal which is to be optically transmitted. For example, when the phase is not 90° but 270°, the distortion may not be accurately compensated, and the data may not be accurately demodulated at a receiving-side device.

First Embodiment

Figure 1:
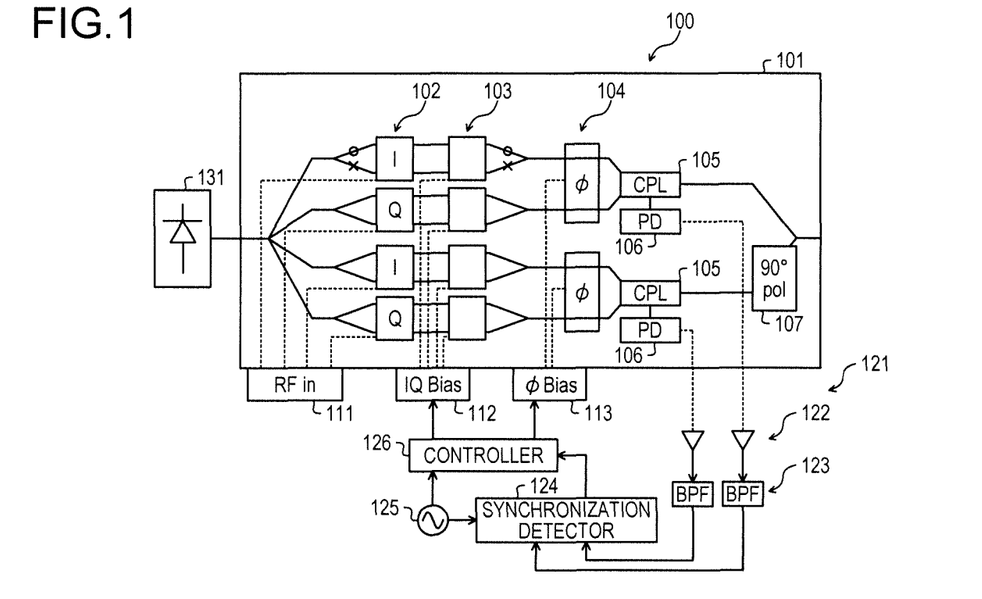
FIG. 1 is a diagram illustrating a configuration example of an optical transmitter according to a first embodiment.

FIG. 1 is a diagram illustrating a configuration example of an optical transmitter according to a first embodiment. The optical transmitter 100 includes a DP-N-QAM MZ type optical modulator (referred to as an "optical modulator" in some cases) 101 which multi-level modulates transmitted data, an ABC circuit 121, and a light source 131. The symbol N(=2) represents an exponential and represents the number (the number of a value per symbol) of multi-level modulations.

Light (continuous wave (CW) light) generated from the light source (optical generator) 131 such as a laser diode is input to the optical modulator 101 to be intensity-modulated. The optical modulator 101 divides the input light by four IQs to guide the divided light to each of the 4 arms (main signal modulators) 102 corresponding to quadrant XI, XQ, YI, and YQ of an IQ map. An electric signal generator (e.g., a driver DRV) which is not illustrated inputs data of an electric signal to be transmitted, to an RF input unit (in) 111, and the electric signal is output to an electrode disposed in parallel to a light guide of each main signal modulator 102. The data is superimposed on an optical signal to be modulated by the main signal modulator 120.

When viewed from a path of the optical signal, an IQ bias electrode 103, for example, a first voltage electrode is installed on a rear end of the main signal modulator 102. The ABC circuit 121 outputs IQ bias voltage for IQ adjustment based on an ABC to the IQ bias input unit 112. The IQ bias voltage is applied to the IQ bias electrode 103 disposed in parallel to each arm part of the light guide and the IQ bias voltage is applied to each of XI, XQ, YI, and YQ.

The voltage is applied to the optical signal by the IQ bias electrode 103, and as a result, a refractive index of the light is changed and the length of an optical path is changed. Therefore, the phase of the optical signal output from the IQ bias electrode 103 may be changed. The IQ bias electrode 103 applies the IQ bias voltage to the light passing through at least one waveguide between two outputs of the main signal modulator 102. The IQ bias voltage is controlled so that the light passing through two waveguides has inverse phases to be accurately modulated.

The optical signal is input to an φ bias electrode (second voltage electrode) 104 after passing through the IQ bias electrode 103. The ABC circuit 121 outputs φ bias voltage for adjusting the φ bias based on the ABC to an IQ bias input unit 113. The φ bias voltage is applied to the φ bias electrode 104 disposed in parallel to each arm part of the light guide, and as a result, the phases of a pair of IQ arms are orthogonal to each other (at 90°).

Herein, the IQ bias electrode 103 controls the phase so that the phase of the optical signal (expressed as o in the drawing) input to the main signal modulator 102 and the phase of the optical signal (expressed as o in the drawing) after output from the IQ bias electrode 103 are identical to each other. Similarly, the IQ bias electrode 103 controls the phase so that the phase of the optical signal (expressed as x in the drawing) input to the main signal modulator 102 and the phase of the optical signal (expressed as x in the drawing) after output from the IQ bias electrode 103 are identical to each other.

The optical signals of a pair of IQ arms after passing through the φ bias electrode 104 are respectively multiplexed and optically output through an optical coupler 105.

A 90° polarizer 107 which is orthogonal to the phase of the optical signal of one IQ arm (at 90°) is provided in the other IQ arm.

Each of a pair of optical couplers 105 splits a part of the optical signal and is received by a detection unit (a light receiving element, a photo diode (PD)) 106. The PD 106 outputs the electric signal by detecting the intensity of the optical signal and the detected signal is output to the ABC circuit 121.

The ABC circuit 121 includes an amplifier 122, a band-pass filter (BPF) 123, a synchronization detector 124, an oscillator 125, and a controller 126.

The controller 126 generates bias signals (pilot signals) of I, Q, and φ having a low frequency (for example, 1 kHz) with respect to the main signal based on a frequency f0 of the oscillator 125. The controller 126 outputs the generated IQ bias voltage to the IQ bias input unit 112 and outputs the φ bias voltage to the φ bias input unit 113.

The detection signal of the PD 106 is amplified by the amplifier 122 and thereafter, input to the BPF 123. The BPF 123 passes the pilot signals of I, Q, and φ. An oscillation signal with f0 of the oscillator 125 is input to the synchronization detector 124 and the synchronization detector 124 synchronously detects the pilot signal (an output of the BPF 123) fed back by using the oscillation signal of f0.

The controller 126 performs a bias control to adjust each bias voltage of I, Q, or φ based on a synchronization detection result of the synchronization detector 124. When the controller 126 is able to accurately control the biases of I, Q, and φ, a signal of 2f0 is observed, and as a result, the signal is not detected by the synchronization detector 124. When the controller 126 is not able to accurately control the biases, the signal of f0 is observed. As a result, a component of f0 is detected by the synchronization detector 124. In a pilot tone superimposing method in which the pilot signal is fed back, each bias voltage of I, Q, or φ is adjusted so that the pilot signal of f0 superimposed with the main signal is not synchronously detected by the synchronization detector 124.

In the case of the controller 126 of the ABC circuit 121 illustrated in FIG. 1, for example, a CPU reads and executes a control program stored in a ROM, etc., and uses a RAM as a working area to implement the function of the controller 126.

In addition to the ABC illustrated in FIG. 1, an optimization method of each bias voltage of I, Q, or φ may adopt other methods. However, the following φ scan method needs to be applied to the bias voltage of φ.

In regard to φ scan

As described above, whenever the signal is created, a pull-in point (the phase of the φ bias converged by the ABC) of the φ bias is changed, and as a result, two pull-in points of 90° and 270° exist. In order to cope therewith, the φ scan method is used in the first embodiment. In the φ scan method, the change of DC power (only the CW light in which the data of the main signal is not superimposed) of the optical signal when φ rotates by bringing an I/Q into an emission state is detected to determine the pull-in point when the signal is created.

Each of FIGS. 2A to 2D and 3A to 3D is a diagram for describing the sequence of φ scan in an ABC of the first embodiment. First, a φ scan type technique in a pull-in case at 90 is described by using FIGS. 2A to 2D.

Figure 2A:
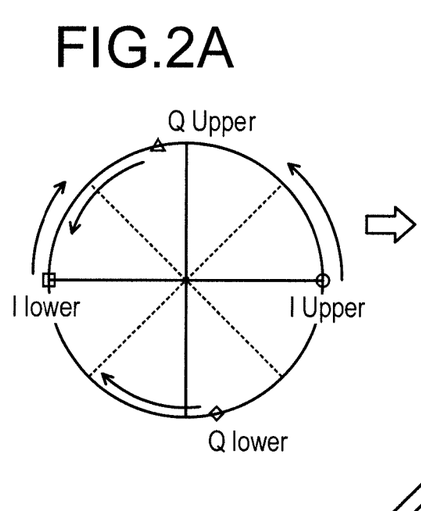
FIGS. 2A to 2D are diagrams for describing a sequence of the φ scan in an ABC of the first embodiment.
Figure 2B:
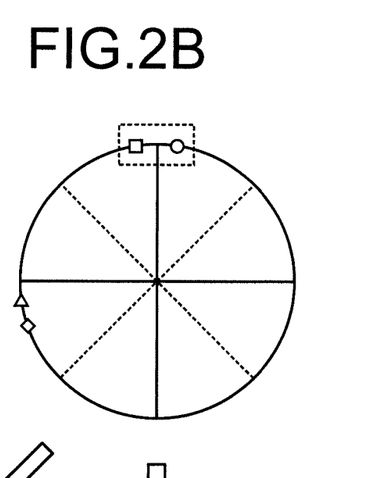
Figure 2C:
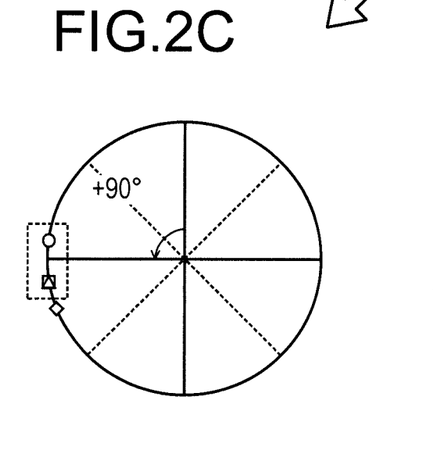
Figure 2D:
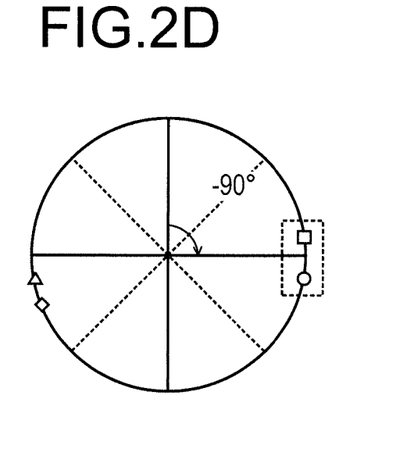

Each point on a circumference illustrated in FIGS. 2A to 2D indicates a location of the phase of the light when each bias is applied in the case of performing the φ scan. In a state of FIG. 2A, an output of the optical transmitter of FIG. 1 becomes an extinction state by the ABC. The light is phase-rotated at approximately 90° by changing the I/Q bias voltage as illustrated in FIG. 2B so as to output the optical signal from the state of FIG. 2A. In FIGS. 2C and 2D, the phases of the light are rotated at +90° and −90° by changing the φ bias voltage, respectively to acquire the power of the light.

The power is maximized when the phase is rotated by +90° and minimized when the phase is rotated by −90° as illustrated in FIGS. 2C and 2D.

Figure 3A:
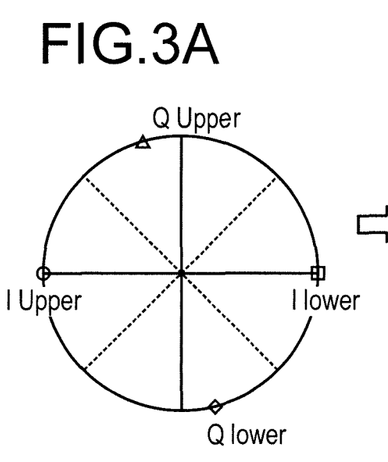
FIGS. 3A to 3D are diagrams for describing a sequence of the φ scan in the ABC of the first embodiment.
Figure 3B:
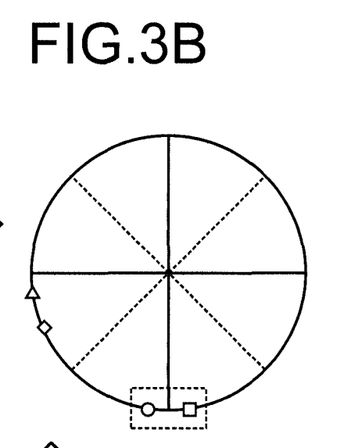
Figure 3C:
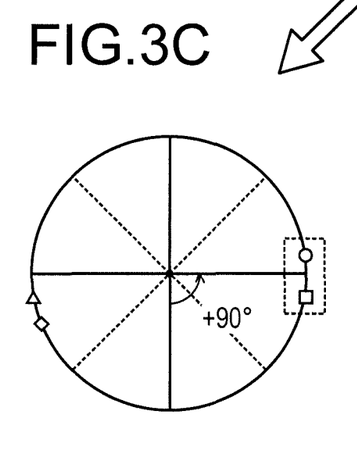
Figure 3D:
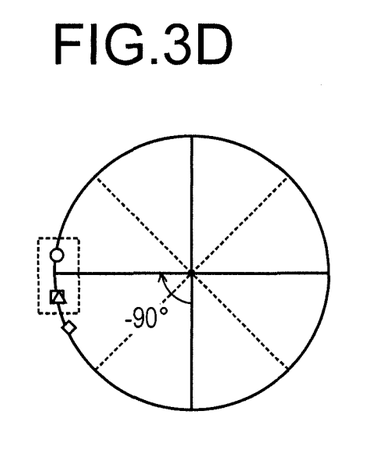

Subsequently, the φ scan type technique in a pull-in case at 270° is described by using FIGS. 3A to 3D. In the state of FIG. 3A, the output becomes the extinction state by the ABC. The light is phase-rotated at approximately 90° by changing the I/Q bias voltage as illustrated in FIG. 3B so as to output the optical signal from the state of FIG. 3A. In FIGS. 3C and 3D, the phases of the light are rotated by +90° and −90°, respectively, by changing the φ bias voltage to acquire the power of the light.

The power is minimized when the phase of the light is rotated by +90° and maximized when the phase of the light is rotated by −90° as illustrated in FIGS. 3C and 3D.

Figure 4:
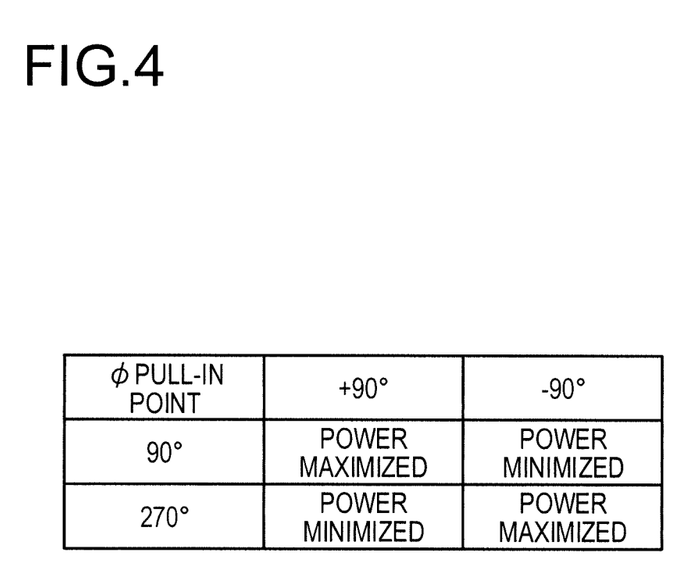
FIG. 4 is a chart illustrating the relationship between a pull-in point by the φ scan and an optical output in the ABC of the first embodiment.

FIG. 4 is a chart illustrating the relationship between a pull-in point by the φ scan and an optical output in the ABC of the first embodiment. When the pull-in point of the φ bias is 90°, a change occurs, in which when the phase of the light is rotated by +90° by changing the φ bias (FIG. 2C), the optical output (power) is maximized and when the phase of the light is rotated by −90° by changing the φ bias (FIG. 2D), the optical output (power) is minimized.

When the pull-in point of the φ bias is 270°, the change occurs, in which when the phase of the light is rotated by +90° by changing the φ bias (FIG. 3C), the optical output (power) is minimized and when the phase of the light is rotated by −90° by changing the φ bias (FIG. 3D), the optical output (power) is maximized.

As illustrated in FIG. 4, when the pull-in point of the φ bias is 90° and 270°, the optical outputs (power) when the phase of the light is rotated by ± by the change in the φ bias are changed inversely to each other. In the first embodiment, it is determined whether the pull-in point of the φ bias is 90° or 270° by using a characteristic of the change in optical output (power) when the phase of the light is rotated by changing the φ bias. For example, the controller 126 may determine whether the pull-in point of the φ bias corresponding to the change in optical output (power) when the phase of the light is rotated by changing the φ bias is 90° or 270° by storing information of FIG. 4 in a memory and referring to the information of FIG. 4.

Figure 5:
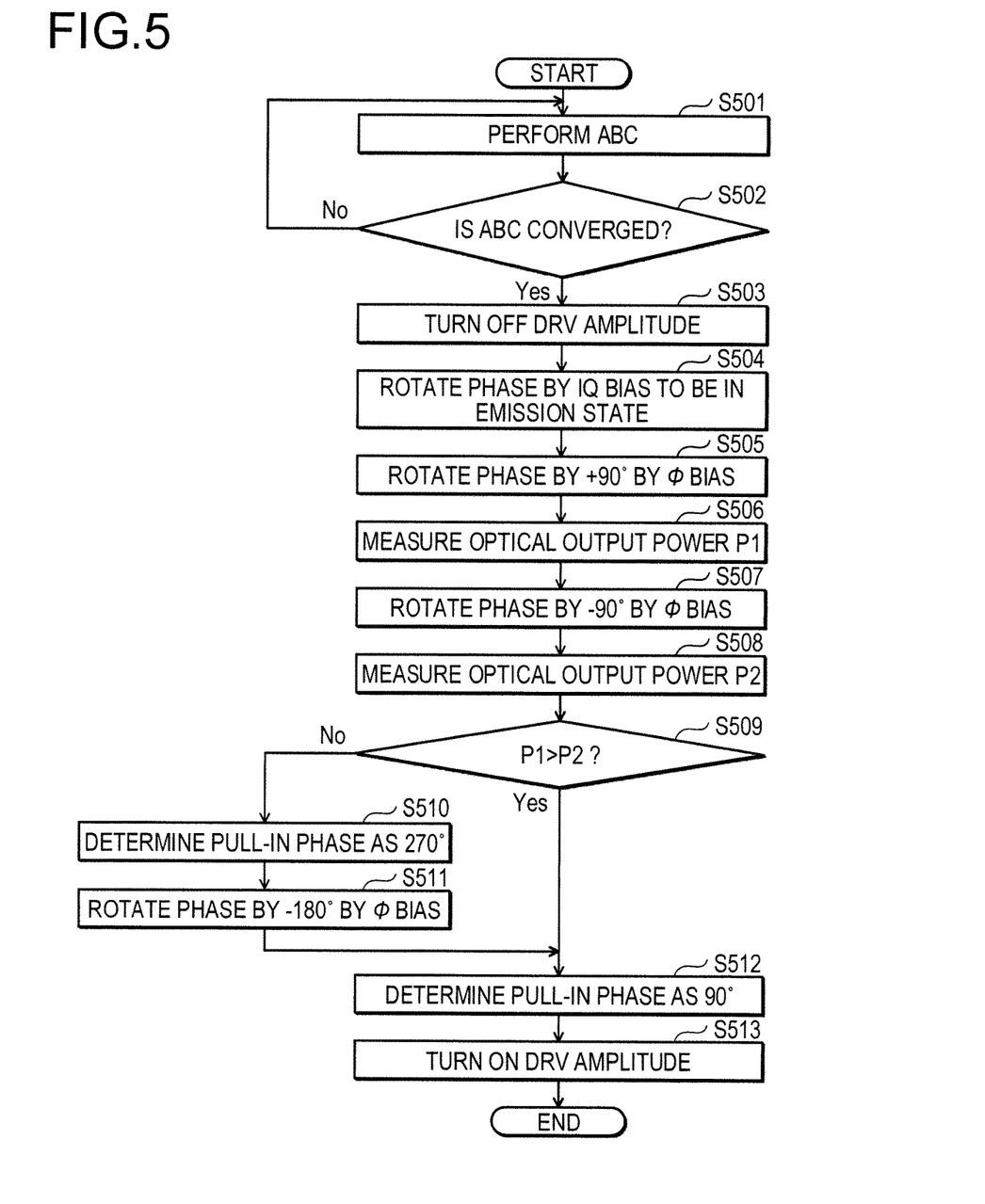
FIG. 5 is a flowchart illustrating a pull-in processing content of a phase in the ABC of the first embodiment.
Figure 6:
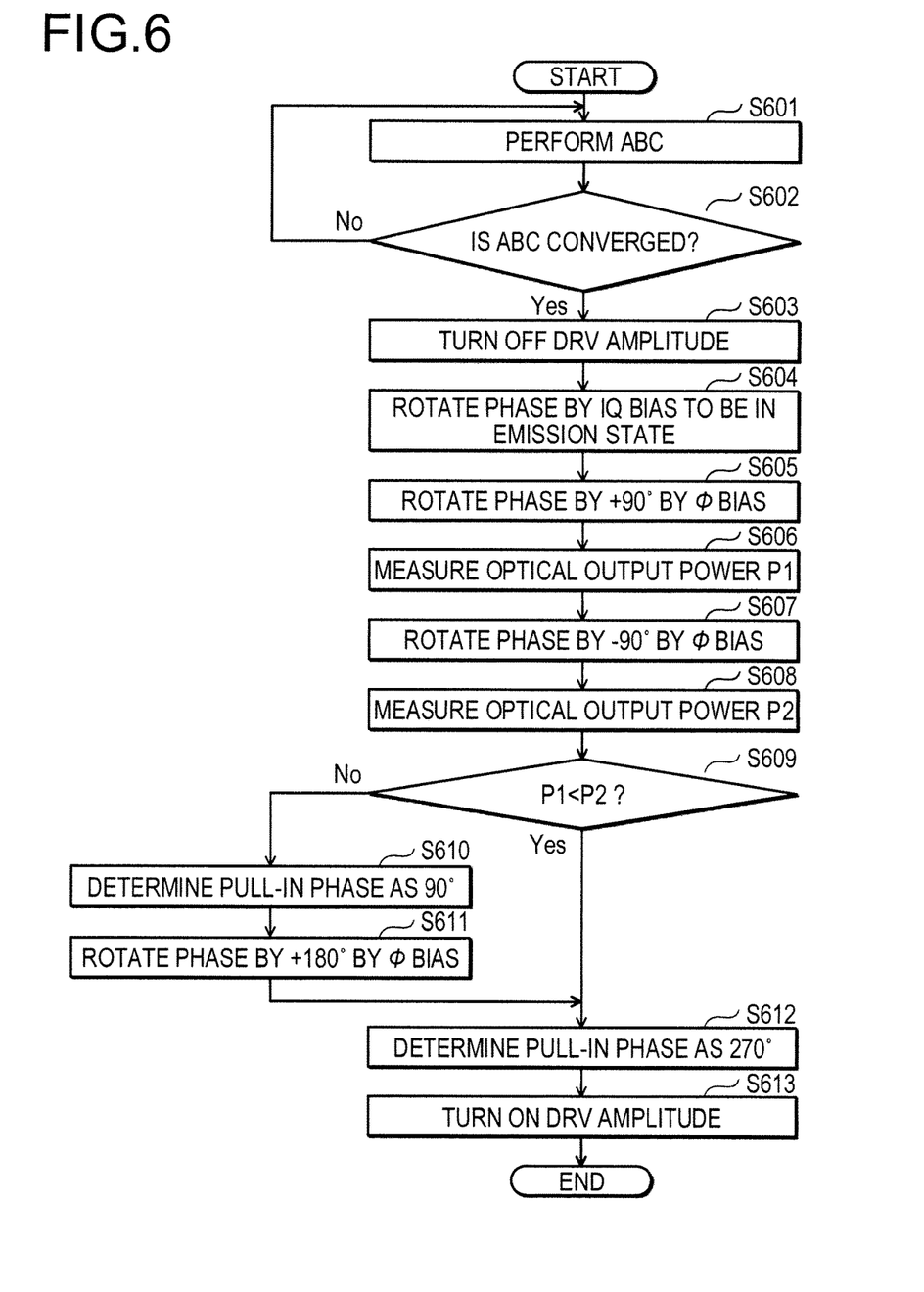
FIG. 6 is a flowchart illustrating a pull-in processing content of the phase in the ABC of the first embodiment.

FIGS. 5 and 6 are flowcharts illustrating a pull-in processing content of a phase in the ABC of the first embodiment. According to the first embodiment, when the signal is created, the φ bias may be pulled in at a predetermined phase (φ bias point).

In an example of FIG. 5, a processing example is illustrated, in which the φ bias pulls in at 90° by execution processing of the CPU by the controller 126. First, the controller 126 performs the ABC when the signal is created (operation S501) and continuously performs the ABC until the ABC is converged (operation S502: No). When it is determined that the ABC is converged (operation S502: Yes), the controller 126 cuts off the main signal by turning OFF a data input (a driver (DRV) amplitude) of the electric processor in the RF input unit 111 (operation S503).

In such a state, the optical output is in the extinction state by the ABC and since the optical signal is not output, the controller 126 brings the I/Q into the emission state by rotating the phase of the light at +90° due to the change in IQ bias (operation S504). As described above, the controller 126 performs a procedure of finding an extinction point while modulation light is not superimposed with signal light when the signal is created. In more detail, the controller 126 detects the change of the DC power (only the CW light in which the data of the main signal is not superimposed) of the optical signal when φ rotates by bringing the I/Q into the emission state.

Thereafter, the controller 126 rotates the phase of the light by +90° by changing the φ bias (corresponding to the state of FIG. 2C, operation S505). In addition, the controller 126 measures the optical output (power) P1 at that time (operation S506).

Subsequently, the controller 126 rotates the phase of the light by −90° by changing the φ bias (corresponding to the state of FIG. 2D, operation S507). In addition, the controller 126 measures the optical output (power) P2 at that time (operation S508).

The controller 126 determines whether the optical power is P1>P2 (operation S509). When it is determined that the optical power is P1≤P2 (operation S509: No), the controller 126 determines that the φ bias is converged at 270° (operation S510). In the determination, for example, the controller 126 reads and determines the data corresponding to the characteristic of FIG. 4 from the memory.

The controller 126 rotates the phase of the light at −180° by changing the φ bias and makes the phase of the light to +90° (operation S511) and the process proceeds to operation S512. Meanwhile, in operation S509, when it is determined that the optical power is P1>P2 (operation S509: Yes), the process proceeds to operation S512.

In operation of S512, since the controller 126 determines that the phase of the φ bias in the ABC is converged to 90° (operation S12) to confirm the phase as 90°, the DRV amplitude is turned ON (operation S513) to communicate the main signal (optical signal) and end such processing.

Subsequently, in an example of FIG. 6, a processing example is illustrated, in which the φ bias pulls in at 270° by the execution processing of the CPU by the controller 126. The processing of operations S601 to S608 is similar to the processing of operations S501 to S508 (see, e.g., FIG. 5).

First, the controller 126 performs the ABC when the signal is created (operation S601) and continuously performs the ABC until the ABC is converged (operation S602: No). When it is determined that the ABC is converged (operation S602: Yes), the controller 126 turns OFF the main signal by turning OFF a data input (the driver amplitude) in the RF input unit 111 (operation S603).

In such a state, since the optical output is in the extinction state by the ABC and the optical signal is not output, the controller 126 brings the I/Q into the emission state by rotating the phase of the light by +90° due to the change in IQ bias (operation S604). As described above, the controller 126 performs the procedure of finding the extinction point while the modulation light is not superimposed with signal light when the signal is created. In more detail, the controller 126 detects the change of the DC power (only the CW light in which the data of the main signal is not superimposed) of the optical signal when φ rotates by bringing the I/Q into the emission state.

Thereafter, the controller 126 rotates the phase of the light by +90° by changing the φ bias (corresponding to the state of FIG. 3C, operation S605). In addition, the controller 126 measures the optical output (power) P1 at that time (operation S606).

Subsequently, the controller 126 rotates the phase of the light by −90° by changing the φ bias (corresponding to the state of FIG. 3D, operation S607). In addition, the controller 126 measures the optical output (power) P2 at that time (operation S608).

The controller 126 determines whether the optical power is P1<P2 (operation S609). When it is determined that the optical power is P1≥P2 (operation S609: No), the controller 126 determines whether the φ bias is converged at 90° (operation S610). In the determination, for example, the controller 126 reads and determines the data corresponding to the characteristic of FIG. 4 from the memory.

The controller 126 rotates the phase of the light by +180° by changing the φ bias and makes the phase of the light to +270° (operation S611) and the process proceeds to operation S612. Meanwhile, in operation S609, when it is determined that the optical power is P1<P2 (operation S609: Yes), the process proceeds to operation S612.

In operation S612, since the controller 126 determines that the phase of the φ bias in the ABC is converged to 270° (operation 612) to confirm the phase as 270°, the DRV amplitude is turned ON (operation S613) to communicate the main signal (optical signal) and end such processing.

After the processing of FIG. 5 or 6, the controller 126 executes a general ABC.

According to the first embodiment described above, when the signal is created, the pull-in point of the φ bias is adjusted. In the adjustment, after the extinction state is set by the ABC, the extinction point is found while the optical signal is not output. Therefore, the pull-in point is determined when the signal is created by detecting the change state of the optical signal at the time of rotating φ by bringing the IQ into the emission state.

In this case, the phase of the light is rotated by each of +90° and −90° by changing the IQ bias to determine whether the pull-in point (φ bias) is 90° or 270°. In addition, the pull-in point of the φ bias may be set at one phase determined during adjustment in advance and it may be determined whether the pull-in point is 90° or 270° based on the change state of the optical signal when the phase of the light is rotated due to the change in φ bias. For example, when the pull-in point is set to 90° and the pull-in point is 270°, the φ bias is set to 90° by rotating the phase of the light at −180° due to the change in φ bias to create the signal.

Detection sensitivity of each optical signal in the PD 106 deteriorates as the modulation scheme becomes high-degree QAM (e.g., 16 QAM or more) and the pull-in point of the φ bias thus becomes negative at 90° or 270°. In the high-degree QAM, even when the detection sensitivity of each optical signal in the PD 106 deteriorates, the pull-in point of the φ bias may be fixed to 90° or 270° by the φ scan described in the first embodiment.

Second Embodiment

In the second embodiment, an application example of an optical transmitter that transmits data by a frequency shift keying (FSK) method is described.

In controlling a transmitting device or a relay apparatus used in an optical network, a low-speed supervisory control auxiliary channel (supervisory auxiliary channel (SAC)) using a different signal band from data transmission is widely used. Optical FSK attracts public attentions as the supervisory control auxiliary channel SAC. In the optical FSK, specific frequency signals in the main signal superimpose with each other (see, e.g., Tanimura et al., "In-Band FSK Auxiliary Channel toward Adaptive Optical Network," IEICE Transaction B Vol, 396-B No. 3, pp. 263-273 in March 2013).

Figure 7:
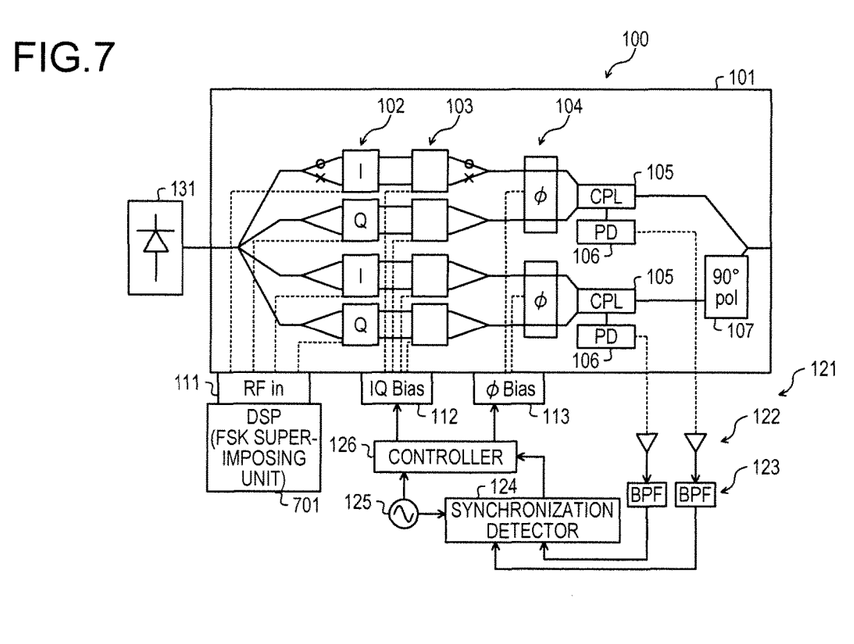
FIG. 7 is a diagram illustrating a configuration example of an optical transmitter according to a second embodiment.

FIG. 7 is a diagram illustrating a configuration example of an optical transmitter according to a second embodiment. In FIG. 7, the same components as the first embodiment (FIG. 1) are denoted by the same reference numerals. As illustrated in FIG. 7, in the optical FSK, an output after FSK-superimposing the transmitted data is input to the RF input unit (in) 111. The function of the optical FSK superimposing may be implemented by, for example, an FSK superimposing unit of a digital signal processor (DSP) 701 and the data is input to the RF input unit (in) 111 through an MZ driver. The DSP has the function of the electric processor which generates the electric signal.

Figure 8A:
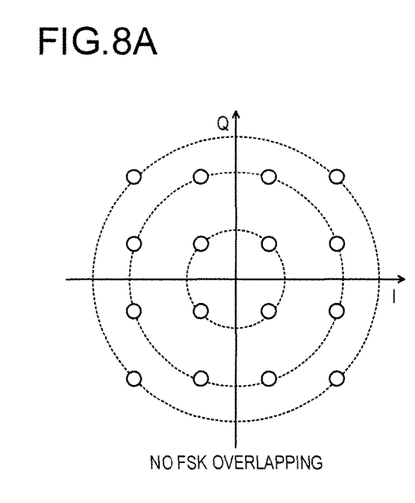
FIGS. 8A and 8B are diagrams illustrating an IQ constellation by optical FSK superimposing of the optical transmitter according to the second embodiment.
Figure 8B:
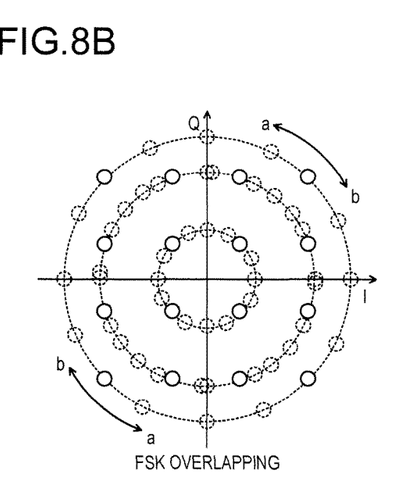

FIGS. 8A and 8B are diagrams illustrating an IQ constellation by optical FSK superimposing of the optical transmitter according to the second embodiment. FIG. 8A illustrates a 16 QAM constellation when there is no optical FSK superimposing and FIG. 8B illustrates a 16 QAM constellation when there is the optical FSK superimposing.

As illustrated in FIG. 8B, the constellation rotates as indicated by an arrow in the drawing by the optical FSK superimposing. The rotational speed becomes the frequency. The rotational direction may be shown at one side "a" or the other side "b" which is opposite thereto for each pull-in phase of the φ bias of the MZ type optical modulator 101 and in this case, in the receiving-side device, demodulated data is inverted. When the data is inverted at the receiving-side device, a frame which is an integration of data is not synchronized, and as a result, the signal is not communicated.

In this regard, as described in the second embodiment, the φ scan method is applied even in the optical FSK superimposing to continuously manipulate the pull-in phase of the φ bias in an arbitrary state, and as a result, the data inversion at the receiving-side device may be prevented.

Figure 9:
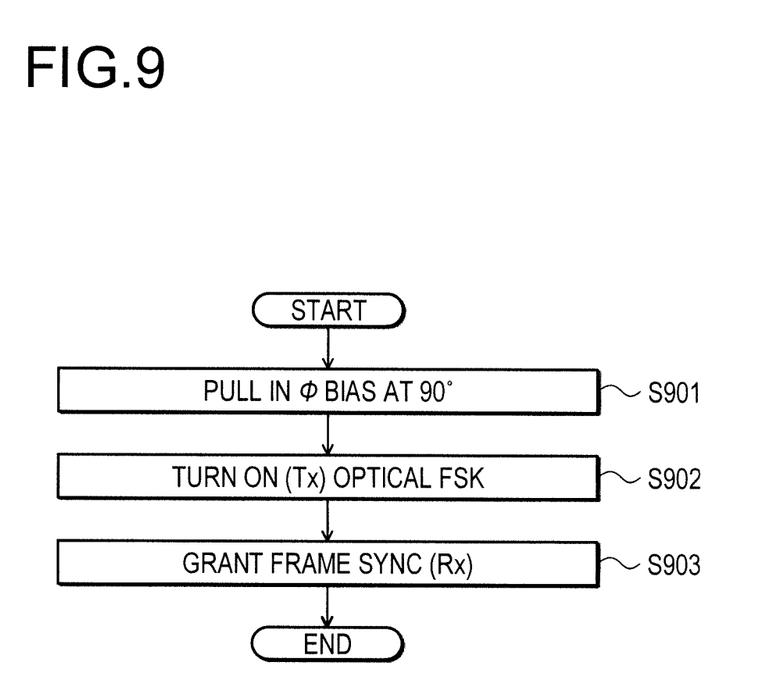
FIG. 9 is a flowchart illustrating a pull-in processing content of a phase in the ABC of the second embodiment.

FIG. 9 is a flowchart illustrating a pull-in processing content of a phase in the ABC of the second embodiment. Even in the optical FSK superimposing, when the signal is created, the φ bias may be pulled in at a predetermined phase (φ bias point).

In an example of FIG. 9, the processing example is illustrated, in which the φ bias pulls in at 90° by execution processing of the CPU by the controller 126. First, the controller 126 pulls in the φ bias at 90° (operation S901). Subsequently, the controller 126 turns ON the function of the optical FSK superimposing of the transmitted data with respect to the DSP 701 (operation S902) to communicate the main signal (optical signal) to which a receiving frame synchronization signal (Frame Sync) is granted (operation S903) and end the above processing.

According to the second embodiment described above, the same effect as the first embodiment may be acquired and when the signal is created, the pull-in point of the φ bias is adjusted to create the signal at the pull-in point (phase) of the φ bias at one phase by the ABC. Further, according to the second embodiment, the optical transmitter transmitting the data by the optical FSK method may be applied to the optical transmitter to prevent the inversion of the demodulated data based on the rotation of the constellation due to a difference in pull-in point of the φ bias. Since the pull-in phase of the φ bias may be manipulated in the arbitrary state, the data inversion in the receiving-side device may be prevented.

In the embodiment described above, in respect to adjustment of the pull-in point of the φ bias, after pull-in of the ABC, RFIn (electric signal) is turned OFF to bring the output into the extinction state and the φ bias is changed to scan the state of the optical phase (φ scan). In this case, actually, when the φ scan is performed, since the output is in the extinction state, there is a possibility that the optical power may not be monitored. Herein, fluctuation of the optical output may be detected by particularly changing the I and Q biases in the extinction state and thereafter, the optical output may be returned to the extinction state in order to more easily monitor the fluctuation of the light.

The method regarding the optical transmission described in the embodiment may be implemented by executing a predetermined control program with a computer (the processor such as the CPU) of a target device (optical transmitter). The control program is recorded in a computer-readable recording medium such as a magnetic disk, an optical disk, a universal serial bus (USB) flash memory, or the like and read from the recording medium by the computer to be executed. Further, the control program may be distributed through a network such as the Internet, or the like.

In the embodiment, the application example of the DP-N-QAM MZ type optical modulator is described, but the present disclosure may be similarly applied even to an N-QAM MZ type optical modulator not using polarization multiplexing. In the DP-N-QAM MZ type optical modulator, an IQ signal for X polarization and an IQ signal for Y polarization are input to the RFIn and the DP-N-QAM MZ type optical modulator has a light waveguide having the number of arms corresponding to the electric signal. In respect thereto, the N-QAM MZ type optical modulator has a configuration in which only an IQ signal for 1 polarization is input to the RFIn and the number of arms of the light waveguide is small to correspond to the input IQ signal, but both optical modulators may be similarly controlled and the pull-in phase of the φ bias may be determined.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. An optical transmitter to transmit an optical signal modulated with an electric signal, the optical transmitter comprising:
    at least one memory;
    at least one processor coupled to the at least one memory and the at least one processor configured to generate the electric signal;
    an optical generator configured to generate light;
    I and Q optical modulators configured to modulate the light generated by the optical generator with the electric signal generated by the at least one processor to create I and Q optical signals;
    a first voltage electrode configured to apply a first voltage to an I optical signal of the I and Q optical signals created by an I optical modulator of the I and Q optical modulators;
    a second voltage electrode configured to apply a second voltage to a Q optical signal of the I and Q optical signals created by a Q optical modulator of the I and Q optical modulators;
    a third voltage electrode configured to apply a third voltage to the I and Q optical signals to which the first voltage and the second voltage are applied by the first voltage electrode and the second voltage electrode, respectively;
    an optical coupler configured to couple the I and Q optical signals to which the third voltage is applied by the third voltage electrode; and
    a detector configured to detect an output optical power of the optical coupler,
    wherein the at least one processor is configured to:
        stop generating the electric signal after adjusting the third voltage such that a phase difference between the I and Q optical signals becomes 90-degree or 270-degree,
        control the third voltage such that the phase difference is rotated by +90-degree and −90-degree, and
        determine whether the phase difference is 90-degree or 270-degree based on a transition of the output optical power of the detector when controlling the third voltage.

2. The optical transmitter according to claim 1, wherein information on the output optical power is stored in the at least one memory, and
wherein the at least one processor is configured to determine whether the phase difference is 90-degree or 270-degree, based on the information stored in the at least one memory.

3. The optical transmitter according to claim 1, wherein the at least one processor is configured to generate a superimposed signal to be modulated by the I and Q optical modulators, to which the electric signal is superimposed by using a frequency shift keying (FSK) method.

4. An optical transmission method comprising:
    generating an electric signal, by a processor;
    generating light, by an optical generator;
    modulating the light generated by the optical generator with the electric signal generated by the processor to create and Q optical signals, by I and Q optical modulators;
    applying a first voltage to an I optical signal of the I and Q optical signals, by a first voltage electrode;
    applying a second voltage to a Q optical signal of the I and Q optical signals, by a second voltage electrode;
    applying a third voltage to the I and Q optical signals to which the first voltage and the second voltage are applied by the first voltage electrode and the second voltage electrode respectively, by a third voltage electrode;
    coupling the I and Q optical signals to which the third voltage is applied by the third voltage electrode, by an optical coupler;
    detecting an output optical power of the optical coupler, by a detector;
    stop generating, by the processor, the electric signal after adjusting the third voltage such that a phase difference between the I and Q optical signals becomes 90-degree or 270-degree;
    controlling, by the processor, the third voltage such that the phase difference is rotated by +90-degree and −90-degree; and
    determining, by the processor, whether the phase difference is 90-degree or 270-degree based on a transition of the output optical power of the detector when controlling the third voltage.

* * * * *